United States Patent Office 3,358,281
Patented Dec. 12, 1967

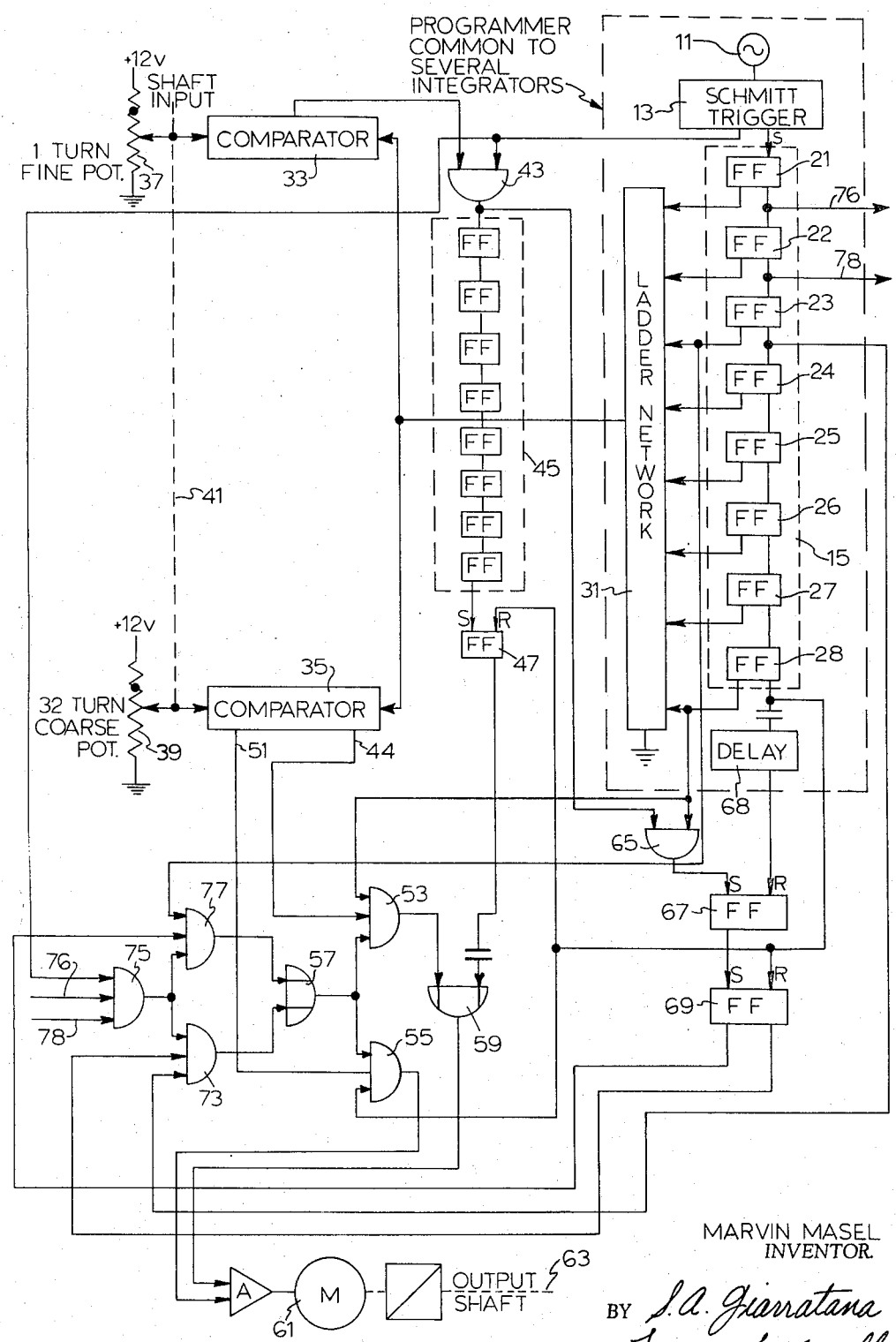

3,358,281
INTEGRATOR
Marvin Masel, West Englewood, N.J., assignor to General Precision Inc., Little Falls, N.J., a corporation of Delaware
Continuation of application Ser. No. 262,578, Mar. 4, 1963. This application July 6, 1966, Ser. No. 565,341
5 Claims. (Cl. 340—347)

ABSTRACT OF THE DISCLOSURE

Movable contacts of potentiometer are driven to angular positions to represent the analog input signals to be integrated. Pulses are continuously applied at a constant repetitive rate to a binary counter. Outputs from each stage of the binary counter are applied to a ladder network which generates an output signal voltage having a staircase wave shape. The output signal of the ladder network is compared with the signal voltages generated by the potentiometers and from this comparison, pulse trains are generated. Integration is carried out by applying the pulses in the pulse trains to a stepper motor, pulses in one train driving the stepper motor in one direction whereas pulses in the other train drive the stepper motor in the other direction.

---

This invention relates to digital integrators and more particularly to a digital integrator for integrating an analog input making use of a potentiometer to convert the analog input to digtal form.

This application is a continuation of Ser. No. 262,578, filed Mar. 4, 1963, in the name of Marvin Masel, and assigned to the same assignee as in the present invention and now abandoned.

Integrators are used in navigational and guidance systems to integrate signals representing acceleration to produce signals representing velocity and to integrate signals representing velocity to obtain signals representing latitude and longitude. This integration can be performed more accurately with digital integrators than with analog integrators. However, in order to use digital integration, it is often necesssary to convert an analog input signal to digital form. This is usually carried out by representing the analog input as the angular position of a shaft. The shaft positions a code wheel or drum, from which digital signals representing the value of the analog input are read out. The apparatus is further complicated by special systems and codes which are required to prevent ambiguity. The output signals obtained from the code wheel or drum digitally representing the analog input value are usually parallel in form and are periodically applied to an accumulator to provide the integration. Because of its complexity a digital integrator, together with the analog to digital converter that it requires, is much more expensive, is much heavier, and requires much more space than a simple analog integrator.

Accordingly, an object of the present invention is to provide an improved digital integrator.

A further object of the present invention is to provide a simpler and more economical digital integrator than those of the prior art.

A further object of this invention is to provide a digital integrator of less weight and size than the digital integrators of the prior art.

A still further object of the present invention is to provide a digital integrator which is adapted to integrate an analog input without the use of a code wheel or code drum.

A still further object of the present invention is to provide a digital integrator which converts an analog input into digital form by means of a potentiometer.

A still further object of this invention is to provide a digital integrator adapted to integrate an analog input signal with the digital signals being represented in serial form.

A still further object of the present invention is to provide an improved analog to digital converter.

A still further object of this invention is to provide ananalog to digital converter which is smaller, lighter and less complex than those of the prior art.

These objects are accomplished in accordance with the present invention by driving the movable contacts of potentiometers to angular positions representing the an analog to digital converter which is smaller, lighter ously applied at a constant repetitive rate to a binary counter. Outputs from each stage of the binary counter are applied to a ladder network, which generates an output signal voltage having a staircase wave shape. The output signal of the ladder network is compared with the signal voltages generated by the potentiometers and from this comparison, pulse trains are generated. Integration is carried out by counting the pulses in the pulse trains.

Further objects and advantages of the present invention will become readily apparent as the following detailed description of the invention unfolds and when taken in conjunction with the single figure of the drawings which illustrates in block form the system of the present invention.

As shown in the drawings an oscillator 11 generates an output signal at a frequency of 1,024 cycles per second. The signal generated by the oscillator 11 is fed to a Schmitt trigger 13 which generates 1,024 output pulses per second. The output pulses from the Schmitt trigger are applied to a conventional binary counter 15 comprising eight flipflops 21–28. The binary counter 15 will therefore have a capacity of 256 and since the pulses applied to the binary counter 15 from the Schmitt trigger 13 are at the rate of 1,024 per second, the binary counter 15 will recycle four times per second.

Each of the flipflops 21–28 has a "0" state and a "1" state and a count registered in the binary counter 15 at any particular instant is determined by the states of the flipflops 21–28. The state of the flipflop 21 will represent the $2^0$ digit of the binary number registered in the counter 15. If the flipflop 21 is in its "1" state the $2^0$ digit of binary number registered in the counter 15 will be a 1 and if the flipflop 21 is in its "0" state and the $2^0$ digit of the binary number registered in the flipflop 15 will be a 0. Similarly, the states of the flipflops 22–28 represent the $2^1$ through the $2^7$ digits if the binary number registered in the counter 15.

An output signal from each of the flipflops 21–28 representing the state of such flipflop is applied to a ladder network 31. Thus the signals applied from the counter 15 to the ladded network 31 will represent the binary number registered in the counter 15. Each of the flipflops 21–28 will apply a 12 volt signal to the ladder network 31 if such flipflop is in its "1" state and will apply a 0 volt signal to the ladder network 31 if such flipflop is in its "0" state.

The ladder network 31 in response to the applied signals produces an output signal voltage proportional to the binary number registered in the binary counter 15 and equal to 12 times the binary number registered in the counter 15 divided by 256. Since the count registered in the counter 15 increases incrementally at a constant rate, the output signal voltage from the ladder 31 will have a wave shape in the form of a staircase starting with 0 volt and increasing incrementally to $255/256$ times 12 volts, at which point the output signal voltage of the ladder network 31 drops back to 0 again. Since the counter 15 recycles four times per second this staircase shape waveform will be produced by the ladder network 31 four times per second.

The output signal voltage of the ladder network 31 is applied to a comparator 33 and to a comparator 35. The comparator 33 receives a signal voltage from the movable arm of a potentiometer 37. The comparator 35 receives a signal voltage from the movable arm of a potentiometer 39. The movable arms of the potentiometers 37 and 39 are positioned by an input shaft 41, the angular position of which represents the analog value to be integrated.

The potentiometer 37 is a one-turn fine potentiometer and the potentiometer 39 is a thirty-two turn coarse potentiometer. A DC voltage of 12 volts is applied across both the potentiometers 37 and 39. The output signal voltage produced on the movable arm of the potentiometer 39 directly represents the angular position of the input shaft 41 up through 32 complete 360° revolutions. The signal produced on the movable arm of the potentiometer 37 is a precise representation of the angular position of the input shaft 41 through one 360° revolution. By using the output signal of the potentiometer 39 to determine which revolution the input shaft 41 is on and using the output signal from the potentiometer 37 to determine precisely the angular position in that particular revolution of the input shaft 41, a precise representation of the angular position of the input shaft 41 through 32 complete revolutions can be obtained.

The comparator 33 compares the signal voltage applied from the ladder network 31 with the signal voltage applied from the movable arm of the potentiometer 37 and produces an output signal voltage whenever the signal voltage from the potentiometer 37 is higher. When the comparator 33 produces an output signal, it enables an AND gate 43. Pulses from the Schmitt trigger 13 are continuously applied to the AND gate 43 and when the AND gate 43 is enabled, these pulses pass through and are applied to a binary counter 45, which is similar to the binary counter 15.

The Schmitt trigger 13 applies a pulse to the AND gate 43 each time it applies a pulse to the binary counter 15. Thus a pulse is applied by the Schmitt trigger 13 to the AND gate 43 on each step of the staircase waveform produced by the ladder network 31. The Schmitt trigger 13 applies the pulses to the AND gate 43 midway between the vertical portion of the staircase waveform. Thus the number of pulses from the Schmitt trigger 13 passing through the AND gate 43 to the binary counter 45 as each staircase waveform is produced by the ladder network 31 will be proportional to the signal voltage produced on the movable arm of the potentiometer 37. In this manner this signal voltage is converted to a digital form represented directly by the number of pulses in a pulse train. Since four staircase waveforms are produced by the ladder network 31 per second, four such pulse trains per second will be applied to the binary counter 45 and thus the output signal voltage from the potentiometer 37 is sampled four times per second.

Each pulse in a pulse train applied to the binary counter 45 represents $1/256$ of 12 volts or in other words $1/256$ of 360°. Until the count in the counter 45 reaches its capacity, the count stored by the counter 45 will be the total number of pulses passing through the AND gate 43. Since the number of pulses in each train of pulses applied to the counter 45 represents a sample of the signal voltage output of the potentiometer 37, the counter 45 will act as an accumulator and add each successive sample to the count registered thereby, until the count in the counter 45 reaches its capacity. Accordingly until the count registered by the counter 45 reaches its capacity, this count will represent the integral of the signal voltage produced at the movable contact of the potentiometer 37.

The units of the integral represented by the count registered in the counter 45 can be determined by dividing the units represented by each pulse in the pulse trains applied to the counter 45 by the sampling rate. Since each pulse represents $1/256$ of 12 volts and the sampling rate is four times per second, each unit of the count registered in the counter 45 will represent $12/(256 \times 4) = 3/256$ volt second.

The capacity of the counter 45 is 256 and each time the counter 45 reaches its capacity and recycles to 0, it produces an output pulse. The number of output pulses produced by the binary counter 45 will equal the number of pulses applied to the binary counter 45 by the AND gate 43 divided by the capacity of the counter 45. Hence the number of output pulses produced by the counter 45 will represent the integral of the signal voltage produced at the movable contact of the potentiometer 37 and each output pulse from the counter 45 will represent an increment of $(256 \times 3)/256 = 3$ volt seconds. Since each volt in the output of the potentiometer 37 represents $1/12$ of a revolution, each output pulse of the counter 45 will represent $1/4$ of a revolution second.

The comparator 35 will produce an output signal from an output 49 whenever the signal voltage on the movable arm of the potentiometer 39 is greater than the output signal voltage from the ladder network 31. The comparator 35 will produce a signal on an output 51 whenever the signal voltage on the movable arm of the potentiometer 39 is less than the output signal voltage from the ladder network 31. The output 49 is connected to an input of an AND gate 53 and the output 51 is connected to an input of an AND gate 55.

The flipflop 28 applies an enabling signal to the AND gate 53 whenever the flipflop 28 is in its "1" state and applies an enabling signal to the AND gate 55 whenever the flipflop 28 is in its "0" state. Thus AND gate 55 will receive an enabling signal from the flipflop 28 when the count registered in the counter 15 is less than 128 and the AND gate 53 will receive an enabling signal from the flipflop 28 whenever the count registered in the counter 15 is greater than 128.

A pulse is applied to the AND gates 53 and 55 from an OR gate 57 for every eighth pulse produced by the Schmitt trigger 13. The AND gate 53 will be enabled and pass the pulses from the OR gate 57 whenever it receives enabling signals from both the output 49 of the comparator 35 and from the flipflop 28. The AND gate 53 will pass a series of pulse trains one for each staircase waveform produced by the ladder network 31 with the number of pulses in each wave train coarsely proportional to the amount that the signal voltage produced at the movable arm of the potentiometer 39 is over 6 volts.

If the voltage produced at the movable arm of the potentiometer 39 is not over 6 volts, the gate 53 will not produce any output pulses because before the output signal voltage of the ladder network 31 reaches 6 volts the gate 53 will not receive an enabling signal from the flipflop 28 and after the signal voltage from the ladder network 31 rises above 6 volts the gate 53 will not receive an enabling signal from the output 49 of the comparator 35. The number of pulses in each train passing through the AND gate 53 will be coarsely proportional to the amount that the output voltage of the potentiometer 39 is over 6 volts because the AND gate 53 will be receiving enabling signals from both the output 49 of the comparator 35 and the flipflop 28 only while the voltage of the staircase waveform is rising from 6 volts to the output voltage of the potentiometer 39.

The AND gate 55 will be enabled and pass pulses from the OR gate 57 only when it receives enabling signals from both the flipflop 28 and from the output 51 of the comparator 35. The gate 55 will produce a series of pulse trains each containing a number of pulses coarsely proportional to the amount that the output signal voltage of the potentiometer 39 is less than 6 volts. The gate 55 will not produce any output pulses when the output signal voltage from the potentiometer 39 is more than 6 volts since the gate 55 will not receive an enabling signal from the flipflop 28 when the count in the counter 15 is 128 or greater, at which time the output signal voltage from the ladder network 31 is 6 volts or greater.

The number of pulses in each train passing through the AND gate 55 will be coarsely proportional to the amount that the output signal voltage of the potentiomeer 39 is below 6 volts because the AND gate 55 will be receiving enabling signals from both the output 51 of the comparator 35 and from the flipflop 28 only while the voltage of the staircase waveform is rising from the output signal voltage of the potentiometer 39 to 6 volts. Since pulses from the OR gate 57 are applied to the AND gates 53 and 55 only once for each 8 trigger pulses produced by the Schmitt trigger 13 and since there are 256 trigger pulses produced by the trigger 13 for each staircase waveform produced by the ladder network 31, each output pulse from the AND gate 53 or the AND gate 55 will represent $8/256$ of 12 volts. Since 12 volts in the output signal of the potentiometer 39 represents 32 revolutions, each output pulse from the AND gates 53 and 55 will represent $8/256$ of 32 revolutions or in other words one revolution of the shaft 41. Since the number of pulses in each output train from the AND gate 53 represents the amount that the output signal voltage of the potentiometer 39 is greater than 6 volts, this number will equal the number of revolutions that the input shaft 41 has turned toward the high voltage end of the potentiometer 39 from the midpoint of the potentiometer 39. Similarly the number of pulses in each train passed by the AND gate 55 will equal the number of revolutions that the shaft 41 has turned from the midpoint of the potentiometer 39 toward the ground side of the potentiometer 39. Hence if the input shaft 41 represents an analog value which is 0 when the movable arm of the potentiometer 39 is at its midpoint of 6 volts, then the total number of pulses passed by the AND gate 53 minus the number of pulses passed by the AND gate 55 will coarsely represent the integral of this analog value. This integral is only coarsely represented since the number of pulses passed by the AND gate 53 or the AND gate 55 in a train will remain the same for one full revolution of the input shaft 41.

The total number of output pulses from the AND gate 53 minus the output pulses from the AND gate 55 actually represents the integral of the number of revolutions that the shaft 41 has rotated from the midpoint of the potentiometer 39 disregarding any partial revolutions. The units of this integral will be divided by the sampling rate, which is four times per second, so that each pulse in the integral will represent $\frac{1}{4}$ of a revolution-second. The output pulses from the AND gate 53 are applied through an OR gate 59 to a stepper motor 61, which in response to each pulse from the OR gate 59 rotates an output shaft 63 one increment in a clockwise direction. The output pulses produced by the AND gate 55 are also applied to the stepper motor 61, which in response to each output pulse from the AND gate 55 rotates the output shaft 63 one increment in a counter clockwise direction. Thus the angular position of the output shaft 63 as a result of the pulses applied thereto from the AND gates 53 and 55 will represent the integral of the number of revolutions that the shaft 41 has rotated from the midpoint on the potentiometer 39, disregarding any partial revolutions. The comparator 35, together with the AND gates 53 and 55 and the circuitry applying periodic pulses to the AND gates 53 and 55 comprise means to compare sequential samples of the staircase waveform produced by the ladder network 31 with the signal voltage produced at the movable contact of the potentiometer 39. Similarly the comparator 33, the AND gate 43, and the Schmitt trigger 13 comprise means to compare sequential samples of the staircase waveform with the voltage produced at the movable contact of the potentiometer 37.

As pointed out above the counter 45 produces output pulses, the sum of which represents the integral of the input shaft position 41 with each pulse representing one-fourth of a revolution-second. Since the output signal voltage produced by the potentiometer 37 represents the amount that the input shaft 41 has rotated from 0° regardless of which revolution the input shaft 41 is on, the output pulses of the counter 45 will represent the integral of the partial revolutions of the shaft 41 disregarding all whole revolutions.

Each time the counter 45 produces an output pulse it sets the flipflop 47. The flipflop 47 is reset shortly thereafter when the counter 15 recycles to 0. When the flipflop 47 is reset, it applies a pulse through the OR gate 59 to the stepper motor 61 causing the stepper motor 61 to rotate the output shaft 63 one increment in a clockwise direction. Thus the output shaft 63 will be rotated one increment in a clockwise direction each time the counter 45 produces an output pulse. The integral represented by the output pulses of the counter 45 will always be the integral of the amount that the shaft 41 has rotated from the 0° position in the positive direction, so that the sum of the pulses passed by the AND gate 53 plus the pulses produced by the counter 45 minus the pulses passed by the AND gate 55 will represent the actual integral of the analog value represented by the position of the input shaft 41. The output pulses from the counter 45 are applied to the stepper motor 61 by means of the flipflop 47 so that these pulses will be applied to the stepper motor 61 only at the time the counter 15 recycles to 0. This insures that no output pulse originating from the counter 45 will be applied to the stepper motor 61 simultaneously with an output pulse from the AND gate 53 or the AND gate 55.

The output pulses of the Schmitt trigger passing through the AND gate 43 are also applied to an AND gate 65, which is enabled only when the count in the counter 15 is 128 or greater. Thus the AND gate 65 will be enabled only when the output voltage of the ladder network 31 is 6 volts or higher. Accordingly, pulses will be applied to the AND gate 65 while it is enabled only if the output voltage from the potentiometer 37 is greater than 6 volts. When the AND gate 65 is enabled and receives a pulse from the AND gate 43, it passes this pulse to set a flipflop 67. Thus the flipflop 67 will be set as each train of pulses passes through the AND gate 43 if the output voltage of the potentiometer 37 represented by this train of pulses is greater than 6 volts, or in other words if the movable arm of the potentiometer 37 is between 180 and 360°.

When the counter 15 recycles to 0, it applies a pulse through a delay line 68 to reset the flipflop 67. When the flipflop 67 resets it sets a flipflop 69. Thus the flipflop 69 will be set shortly after the end of each staircase waveform produced by the ladder network 31 if during the generation of such staircase waveform the movable arm of the potentiometer 37 was positioned between 180 and 360°. The output pulse produced by the counter 15 each time it recycles to zero also is used to reset the flipflop 69. The flipflop 67, because of the delay provided by the delay line 68, will not be reset until after the output pulse from the counter 15 is applied to the flipflop 69 to reset it. Thus the setting of the flipflop 69 will occur shortly after the reset pulse from the counter 15 is produced when the counter 15 recycles to zero. Thus the flipflop 69 will be set for the entire succeeding staircase waveform produced by the ladder network 31 if during the preceding staircase waveform the movable arm of the potentiometer 37 was positioned between 180 and 360 degrees.

If the movable arm of the potentiometer 37 is between 0 and 180 degrees, the flipflop 69 will not be set following the reset pulse from the counter 15 produced when it recycles to zero and accordingly during the succeeding staircase waveform the flipflop 69 will be in its reset state. Thus the condition of the flipflop 69 during each staircase waveform is determined by the position of the movable arm of the potentiometer 37 during the preceding staircase waveform. Accordingly, if during the preceding staircase waveform the movable arm of the potentiometer 37 was between 0 and 180, then during the succeeding staircase waveform the flipflop 69 will be in a reset condition; and if the movable arm of the potentiometer 37 is between 180 and 360 degrees during the preceding staircase waveform, then the flipflop 69 will be in a set condition during the succeeding staircase waveform.

When the flipflop 69 is in a set condition, it applies an enabling signal to an AND gate 71; and when the flipflop 69 is in a reset condition, it applies an enabling signal to an AND gate 73. Pulses are applied to the AND gates 71 and 73 from the output of an AND gate 75, which has pulses applied thereto from the Schmitt trigger 13. The AND gate 75 is connected to receive signals from both the flipflop 21 and the flipflop 22 of the counter 15 on lines 76 and 78 respectively. When the AND gate 75 receives enabling signals from both the flipflops 21 and 22 it will pass a pulse applied from the Schmitt trigger 13. The flipflop 21 will apply an enabling signal to the AND gate 75 when the flipflop 21 is in its zero state and the flipflop 22 will apply an enabling signal to the AND gate 75 when the flipflop 22 is in its zero state. The flipflops 21 and 22 will both be in their zero states only when the count registered in the counter 15 is zero or a multiple of four. Thus the AND gate 75 will apply an output pulse to the AND gates 71 and 73 for every fourth pulse produced by the Schmitt trigger 13 and these pulses will be produced at the times when the count registered in the counter 15 is zero, four, or a multiple of four.

The AND gate 71 in addition to being connected to receive a signal from the flipflop 69 is also connected to receive a signal from the flipflop 23 of the counter 15 and will be enabled to pass a pulse applied from the AND gate 75 when it receives enabling signals from both the flipflop 69 and the flipflop 23.

As pointed out above the AND gate 71 will receive an enabling signal from the flipflop 69 when the flipflop 69 is in a set condition. The AND gate 71 will receive an enabling signal from the flipflop 23 when the flipflop 23 is in its "1" state. Thus, in order for the AND gate 71 to pass a pulse from the AND gate 75 the flipflop 23 must be in its "1" state when a pulse is applied from the AND gate 75. Since the AND gate 75 will apply a pulse to the AND gate 71 only when the flipflops 21 and 22 are in their zero states, a pulse can be produced at the output of the AND gate 71 only when the flipflop 23 is in its "1" state and the flipflops 21 and 22 are in their "0" states. This condition occurs when the count registered by the counter 15 is four, four plus eight, or four plus a multiple of eight, such as 20, 28, etc. Thus if the flipflop 69 is in a set condition, the AND gate 71 will produce an output pulse for every eight pulses produced by the Schmitt trigger 13 and these output pulses will occur when the count registered by the counter 15 is four, four plus eight, or four plus a multiple of eight.

The AND gate 73 in addition to being connected to receive a signal from the flipflop 69 is also connected to receive a signal from the flipflop 23 and will pass the pulses applied from the AND gate 75 when it receives enabling signals from both these flipflops.

As pointed out above the flipflop 69 applies an enabling signal to the AND gate 73 when the flipflop 69 is in its reset condition. The flipflop 23 will apply an enabling signal to the AND gate 73 when it is in its "0" state. Thus the AND gate 73 will receive an enabling signal from the flipflop 23 and a pulse from the AND gate 75 only when all three of the flipflops 21, 22 and 23 are in their zero states. Therefore, the AND gate 73 can only produce an output pulse when all three of the flipflops 21, 22 and 23 are in their "0" states. Thus the AND gate 73 will produce an output pulse when the flipflop 69 is in its reset condition and the count registered by the counter 15 is zero, eight, or a multiple of eight. Accordingly when the flipflop 69 is in its reset condition, the AND gate 73 will produce one output pulse for every eight pulses produced by the Schmitt trigger 13 and these pulses will occur when the count registered by the counter 15 is zero, eight, and a multiple of eight.

From the above explanation it will be apparent that either the AND gate 71 or the AND gate 73 will be passing output pulses, one for every eight pulses produced by the Schmitt trigger 13. If the flipflop 69 is in its set condition, the AND gate 71 will be passing its output pulses and if the flipflop 69 is in its reset condition the AND gate 73 will be passing its output pulses.

The pulses produced by the AND gates 71 and 73 are applied through an OR gate 57 to the AND gates 53 and 55. Thus the AND gates 53 and 55 will receive pulses at a rate of one for every eight pulses produced by the Schmitt trigger 13. The pulses applied to the AND gates 53 and 55 from the OR gate 57 will occur when the count registered in the counter 15 is four, four plus eight, or four plus a multiple of eight if the flipflop 69 is in its set condition and these pulses will occur when the count registered in the counter 15 is zero, eight, or a multiple of eight if the flipflop 69 is in its reset condition.

This arrangement is used to prevent ambiguity errors resulting from the combining of the output of the potentiometer 37 with the output from the coarse potentiometer 39 to provide the precise integral of the analog value represented by the angular position of the shaft 41.

In connection with this ambiguity prevention, the movable arm of the potentiometer 39 is displaced 30° from the movable arm of the potentiometer 37 so that when the potentiometer 37 is at 0° the movable arm of the potentiometer 39 will be at 270°. Ambiguity error prevention is needed because it is impracticable to precisely align the movable arm of the potentiometer 37 with the movable arm of the potentiometer 39. For example, if the movable arms of these two potentiometers were supposed to be aligned in the same angular position but actually the movable arm of the potentiometer 37 was slightly displaced from the movable arm of the potentiometer 39 so that when the movable arm of the potentiometer 39 was at 0+ degrees, the movable arm of the potentiometer 37 was at 360− degrees, then the output from the two potentiometers when combined would give an incorrect reading by almost one revolution whenever the two arms happened to be positioned on opposite sides of 0 degrees.

The system of the present invention prevents this by displacing the movable arm of the potentiometer 39 30° from the movable arm of the potentiometer 37 and counting one revolution of the movable arm of the potentiometer 39 only when the movable arm of the potentiometer 39 has moved through one full revolution if the movable arm of the potentiometer 37 was between 0 and 180° and counting one full revolution for the movable arm of the potentiometer 39 when it has rotated more than 180° of such revolution if the movable arm of the potentiometer 37 was between 180° and 360° on the preceding reading or sample.

This is accomplished by the pulses from the OR gate 57 being applied to the AND gates 53 and 55 when the count registered in the counter 15 is four, four plus eight, or four plus a multiple of eight if the flipflop 69 is in a set condition indicating that the movable arm of the potentiometer 37 on the preceding reading was between 180° and 360° and by applying pulses to the AND gates 53 and 55 when the count registered by the counter 15 is zero, eight or a multiple of eight, when the flipflop 69 is in a reset condition indicating that during the preceding reading the movable arm of the potentiometer 37 was between 0 and 180°.

Thus there is provided a simple digital integrator adapted to integrate an analog input without requiring the heavy, space taking drum type analog to digital converter used in the systems of the prior art.

Many modifications may be made to the above described specific embodiment of the invention without departing from the spirit and scope of the invention which is limited only as defined in the appended claims.

What is claimed is:

1. A digital integrator comprising:
a rotatable input shaft;
a pair of potentiometers having respective movable contacts driven by said input shaft, one of said potentiometers providing coarse signal and the other fine signal of voltages applied thereto;
means to apply voltages across said potentiometers;
means, including a source of electrical pulses, a bank of bistable switching elements cascaded to form a counter for pulses from the pulse source, and a ladder network, to generate a voltage of cyclical staircase waveform;
first comparator means to compare the staircase waveform with the signal voltage output of the fine potentiometer and generate a gate signal when the latter is greater;
second comparator means to compare the staircase waveform with the signal voltage output of the coarse potentiometer and generate an enabling signal when one is greater and a different enabling signal when the other is greater;
a second pulse counter having a two-input AND gate in series with its input, said AND gate having one input connected to said source of pulses and the other to the output of said first comparator means;
logic circuit means connected to said counters, to the outputs of said second comparator and to said pulse source to generate digital output pulse signals in the one and the other direction representative of the position of said input shaft; and
a stepper motor coupled to said logic circuit means, said output pulse signals being applied thereto for incrementally rotating said stepper motor in the one or the other direction.

2. A digital integrator according to claim 1, wherein said logic circuit means includes:
a pair of AND gates each having three inputs and requiring the coincidence of enabling signals on two inputs to pass a signal on the third, a respective one of said two enabling inputs being connected to the outputs of the second comparator means;
means to apply an enabling signal to the other of the two enabling inputs of one or the other of said pair of AND gates depending on whether the instantaneous amplitude of said staircase waveform voltage is less or greater than its median value; and
gate means for applying a controlled portion of the pulses from said pulse source to the third input of each of said pair of gates.

3. A digital integrator according to claim 1, wherein said logic circuit means includes:
a pair of AND gates each having three inputs and requiring the coincidence of enabling signals on two inputs to pass a signal on the third, a respective one of said two enabling inputs being connected to the outputs of the second comparator means;
an OR gate having two inputs and an output, the output being connected to both of the respective third inputs of said pair of AND gates;
a second pair of AND gates each having three inputs and requiring the coincidence of enabling signals on two of the inputs to pass a signal on the third;
an additional AND gate having an output and three inputs and requiring the coincidence of enabling signals on two of the inputs to pass a signal on the third, said third input being connected to said source of electrical pulses and said output being connected to the third input of each of said second pair of AND gates; and
means including connections of the two enabling inputs of each of said second AND gates to said bank of bistable switching elements to derive therefrom enabling signals for one or the other of the additional AND gates on a selected pulse from said pulse source which represents a small fraction of the total count capacity of said first pulse counter.

4. A digital integrator according to claim 3, wherein said last-named means comprises:
a delay means and a pair of bistable elements having set and reset conditions, the first of said elements being connected, through the delay means, to said first pulse counter so as to be reset each time the counter recycles and connected to set the second element each time the first element is reset;
an additional two-input AND gate having an output connected to set said first of the pair of bistable elements, one input of the AND gate being connected to receive an enabling signal from the first counter when its count is greater than half its total capacity and the other input being connected to the output of the first-mentioned two-input AND gate; and
means connecting the second bistable element to reset without delay each time the first counter recycles, to apply an enabling pulse to one enabling input of one of said second pair of AND gates when set, and to one enabling input of the other of said second pair of AND gates when reset.

5. A digital integrator according to claim 4, further including:
an additional bistable element having a set and a reset condition connected to be set when said second counter recycles and reset when said first counter recycles; and
an additional OR gate having an input connected to the output of that one of said first pair of AND gates receiving an enabling signal when the amplitude of the staircase voltage is greater than its median value, the OR gate having a second input receiving a signal from said additional bistable element when the element is reset.

References Cited

UNITED STATES PATENTS 2,869,079  1/1959  Staffin et al. _____ 332—11
3,141,160  7/1964  Hartke et al. _____ 340—347

OTHER REFERENCES

Carbrey: "Pulse Code Modulation Terminal and Repeater Methods," Electronic Design 66, June 22, 1960.

MAYNARD R. WILBUR, *Primary Examiner.*

DARYL W. COOK, *Examiner.*

J. H. WALLACE, *Assistant Examiner.*